No. 668,991. Patented Feb. 26, 1901.
A. V. JOHNSTON.
ADJUSTABLE PALLET FOR WATCHES.
(Application filed Nov. 2, 1900.)
(No Model.)

Witnesses
James R. Mansfield
W. McClary Sullivan

Albert V. Johnston,
Inventor,
By
Alexander & Dowell
Attorneys.

UNITED STATES PATENT OFFICE.

ALBERT V. JOHNSTON, OF EVANS CITY, PENNSYLVANIA.

ADJUSTABLE PALLET FOR WATCHES.

SPECIFICATION forming part of Letters Patent No. 668,991, dated February 26, 1901.

Application filed November 2, 1900. Serial No. 35,262. (No model.)

*To all whom it may concern:*

Be it known that I, ALBERT V. JOHNSTON, of Evans City, in the county of Butler and State of Pennsylvania, have invented certain new and useful Improvements in Adjustable Pallets for Escapement Mechanism; and I hereby declare that the following is a full, clear, and exact description thereof, reference being had to the accompanying drawings, which form part of this specification.

This invention is an improvement in escapement mechanism of watches, clocks, and other instruments, and has particular reference to the pallets of the escapement-lever, which controls the movement of the escapement-wheel.

In the finer instruments, as is well known, the escapement-lever is provided with jeweled pallets, which contact with the teeth of the escapement-wheel, and it sometimes becomes necessary to adjust the position of these jewels. This is a tedious and difficult thing to do in the ordinary construction, as the jewels are usually held in position by shellac, and in order to adjust them this solder has to be melted, then the jewels adjusted and resoldered to hold them in position, and sometimes in order to obtain the desired adjustment of the jewels this operation has to be repeated a number of times before the jewels are finally properly adjusted.

The object of the present invention, therefore, is to simplify the adjustment of the pallets or jewels by mounting them in adjustable slides upon the escapement-arms; and the invention consists in the novel construction of the pallet-adjusting devices, whereby the pallets can be adjusted by a screw-driver with the utmost nicety and with great ease.

Figure 1:
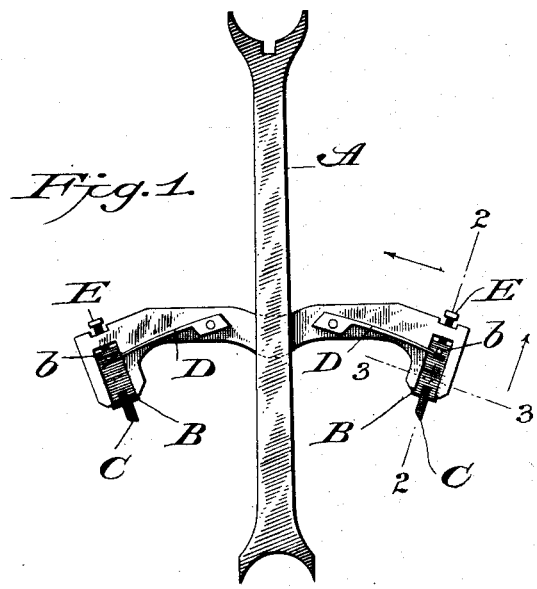
Figure 2:
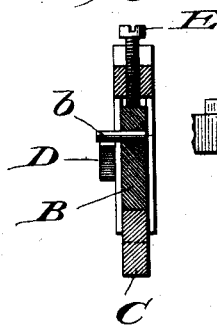
Figure 3:
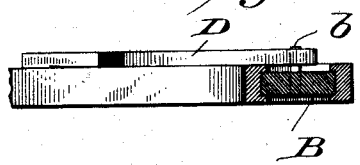

In the drawings, Figure 1 represents an enlarged view of an escapement-lever with the adjustable pallets or jewel-supports. Fig. 2 is a transverse section on line 2 2, Fig. 1. Fig. 3 is a transverse section on line 3 3, Fig. 1.

A designates the escapement-lever, which may be of any suitable construction, an ordinary form being illustrated in the drawings. On the opposite escapement-wheel-engaging arms of the lever are mounted the pallets, composed of slides B, which are held in grooved guideways in the lever-arms, said guideways being formed on lines which radiate from or converge toward the center of the escapement-wheel, (not shown,) so as to properly engage with the teeth of the latter. On the inner end of each slide a pallet or jewel C may be permanently secured in any suitable manner. The slides may be continuously pressed into the slots and away from the escapement-wheel by means of the springs D, which are fastened to the escapement-lever and engage pins $b$ on the slides, as shown. The slides may be adjusted inwardly by means of the screws E, which are tapped through suitable threaded holes in the escapement-lever arms at the outer ends of the slots.

It will be obvious from an inspection of the drawings that either pallet may be quickly adjusted toward or from the escapement-wheel simply by turning the regulating-screw E, and therefore if it becomes necessary to adjust the pallets for any cause it can be quickly and easily done with the utmost nicety.

Of course, as above stated, the device is applicable to any form of escapement mechanism where adjustable pallets or jewels are used, and I do not confine myself to the precise form shown in the drawings.

Having thus fully described my invention, what I claim as new, and desire to secure by Letters Patent of the United States, is—

1. The combination with an escapement-lever anchor, of a slide thereon carrying a pallet or contact-piece and adjustable toward or from the escapement-wheel, and a screw for longitudinally shifting or adjusting said slide on the anchor, substantially as described.

2. The combination of the escapement-lever, the slides mounted on the anchor thereof, springs for pressing said slides outwardly and screws for adjusting said slides inwardly, and pallets or contact-pieces mounted on the slides, substantially as described.

3. The combination of the escapement-lever having open-ended slots in its anchor, the pallet-carrying slides mounted in said slots, and screws for adjusting said slides longitudinally in the slots, substantially as described and for the purpose set forth.

4. The combination of the escapement-lever having converging open-ended slots at the extremities of its anchor, slides mounted in said slots, pallets attached to said slides, springs for forcing said slides outwardly, and screws for adjusting said slides, for the purpose and substantially as described.

In testimony that I claim the foregoing as my own I affix my signature in presence of two witnesses.

ALBERT V. JOHNSTON.

Witnesses:
I. J. SIMM,
E. P. SUTTON.